United States Patent [19]
Bruno et al.

[11] Patent Number: 5,806,051
[45] Date of Patent: Sep. 8, 1998

[54] ANALOG PROCESSOR OF ANTECEDENT PARTS OF FUZZY LOGIC RULES

[75] Inventors: Dario Bruno, Palermo; Biagio Giacalone, Trapani; Nicolo Manaresi, Bologna, all of Italy

[73] Assignee: Consorzio per la Ricerca sulla Microelettronica nel Mezzogiorno, Catania, Italy

[21] Appl. No.: 550,871

[22] Filed: Oct. 31, 1995

[30] Foreign Application Priority Data

Oct. 31, 1994 [EP] European Pat. Off. .............. 94830517

[51] Int. Cl.⁶ ...................................................... G06G 7/00
[52] U.S. Cl. ...................................... 706/3; 706/3
[58] Field of Search .................... 395/3, 51, 61; 364/807

[56] References Cited

U.S. PATENT DOCUMENTS

| | | | |
|---|---|---|---|
| 5,113,366 | 5/1992 | Yamakawa | 395/3 |
| 5,341,323 | 8/1994 | Yamakawa | 395/3 |
| 5,568,413 | 10/1996 | Landolt | 395/3 |
| 5,570,456 | 10/1996 | Landolt | 395/3 |

FOREIGN PATENT DOCUMENTS 0 617 359  9/1994  European Pat. Off. .......... G06F 7/60

OTHER PUBLICATIONS

M. Gupta et al., "Design of fuzzy logic controllers based on generalized T-operators," from Fuzzy sets and systems vol. 40 No. 3, pp. 473–389, Apr. 1991.

Landolt, "Efficient analog CMOS implementation of fuzzy rules by direct synthesis of multidimensional fuzzy subspaces," Int'l conference on fuzzy systems, Dec. 1993.

Sasaki, "Current-mode analog fuzzy hardware with voltage input interface and normalization locked loop," International conference on fuzzy systems, Dec. 1992.

*Primary Examiner*—Tariq R. Hafiz
*Assistant Examiner*—Jeffrey S. Smith
*Attorney, Agent, or Firm*—David V. Carlson; Seed and Berry LLP

[57] ABSTRACT

Analog processor of antecedent parts of fuzzy logic inference rules and comprising a plurality of analog generators of membership function each having an output supplying a value corresponding to a degree of truth complemented to one ($\alpha'$) of logical assignments of the type (A is A') with the outputs being connected together to form a common circuit node and also connected to a current generator and the processor comprising also a voltage control device inserted between a supply voltage pole and a ground voltage reference and a one-way element connected to the common circuit node and the one-way element having an output producing an overall degree of truth for the antecedent part of the fuzzy rule to be processed.

29 Claims, 5 Drawing Sheets

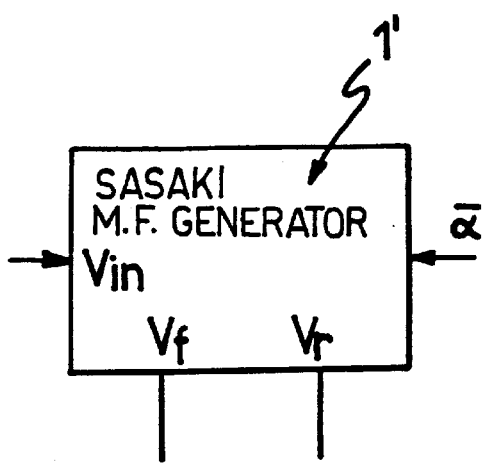
FIG.3A
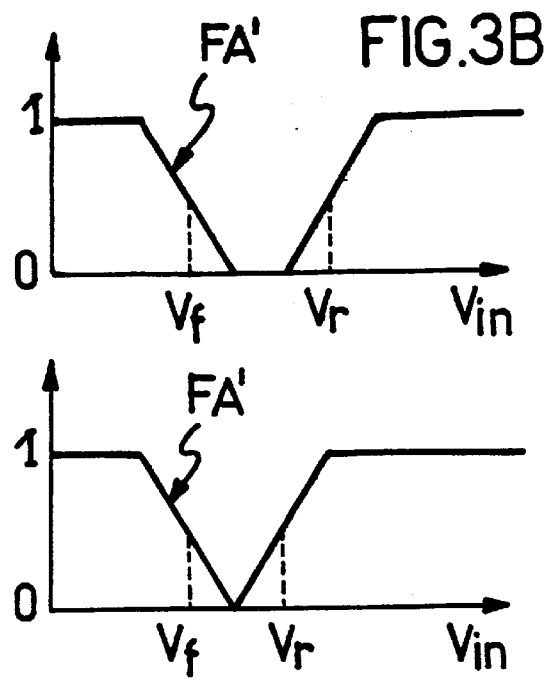
FIG.3B
FIG.3C
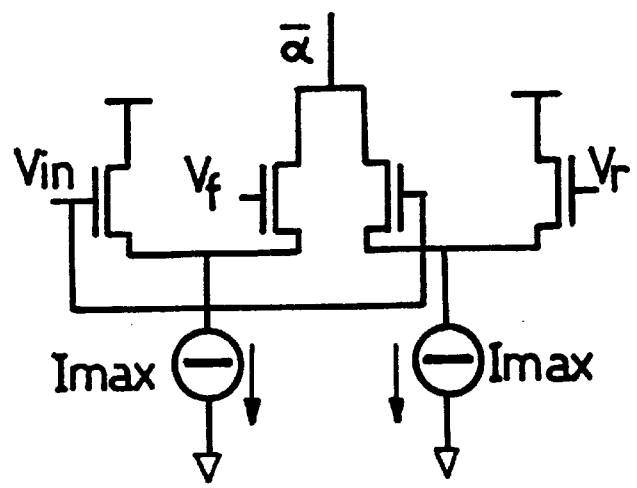
FIG.4
PRIOR ART

ANALOG PROCESSOR OF ANTECEDENT PARTS OF FUZZY LOGIC RULES

TECHNICAL FIELD

The present invention relates to an analog processor for antecedent parts of fuzzy logic inference rules. More specifically the present invention relates to an analog processor of antecedent parts of fuzzy logic inference rules.

BACKGROUND OF THE INVENTION

Fuzzy logic has now been established as a technique capable of supplying solutions for broad classes of control problems for which conventional techniques, e.g., those based on Boolean logic, have proven unsuited for providing acceptable performance at acceptable cost.

Fuzzy logic supplies a method of modeling the "unprecise" kinds of reasoning typical of the human mind but which play an essential role in the human ability to make decisions under conditions of uncertainty.

Fuzzy logic operates on a linguistic description of reality using a particular class of variables termed linguistic variables. The value of said variables consists for example of words or phrases of any natural or artificial language. Virtually to each variable is assigned a corresponding semantic meaning of the words or phrases used during modeling of a given problem.

In addition, to each variable can be syntactically joined a group of values depending thereon and which can assume different meanings depending on the context in which they are employed.

Each value assigned to a linguistic variable is represented by a so-called fuzzy set, i.e., a possibility distribution function which links each value of the variable in the corresponding definition domain known also as universe of discourse U.

The functions which identify a fuzzy set in the universe of discourse of a variable are called membership functions FA. For example, a value FA(m)=0 indicates non-membership of the point m in the fuzzy set identified by the function. Conversely, a value FA(m)=1 indicates certainty of membership of the point m in the fuzzy set.

Among the membership functions, appropriate logical operations—termed "inferential"—which permit description of the behavior of a system with the change in input parameters are performable. These operations are performed by means of fuzzy rules which have generally a syntax of the following type:

IF ($A_1$ is $A'_1$) AND(OR) ($A_2$ is $A'_2$). . . , THEN (Y is Y')

where Ai are the input values, A'i and Y' are fuzzy sets, associated with respective membership functions FA and Y is the output value.

The part of the rule preceding the term THEN is called "left" or antecedent part while that following said term is called "right" or consequent part of the inference rule.

One of the basic fuzzy logic operations is the assignment operation (A is A') where A is the term associated with an input of the system and A' is the linguistic expression identifying one of the fuzzy sets associated with said input with associated membership function FA.

Let us consider for example an input T corresponding to the temperature values. T' will be one of the attributes associable with said temperature variable, e.g., "LOW". In computing terms the assignment (T is T') is equivalent to attribution of a value between 0 and 1 expressing the "degree of truth" a which is verified the statement: "temperature" is LOW.

This degree of truth α is the value of the membership functions T' opposite the input temperature T as shown in FIG. 1.

Herein below, we shall consider input functions of the so-called "crisp" type, i.e., functions with only one value like the inputs of a real process.

Use of the logical operator AND (logical sum) between two or more assignments expresses with an overall degree of truth Ω, again between 0 and 1, "how much" it is true that the two or more expressions are simultaneously true.

In the known technical solutions, calculation of the logical sum AND between two linguistic assignments is performed by choosing the smallest of the degrees of truth α of the individual expressions.

The logical operators of type OR are typically linked to the computation of the highest among the degrees of truth α of the individual assignments (A is A'). The OR type operator may be implemented by using the AND type operator on the degrees of truth α complemented to 1.

Calculation of the inferences in the fuzzy multivalue logic was performed heretofore essentially by fuzzy digital processors. These processors, however, exhibit considerable problems from the view point of the memory area necessary for storing the data on the membership functions FA describing the process to be analyzed.

Besides these digital processors, there has gained a footing, even though more modestly, the concept of structures based on an analog approach to the problem of fuzzy calculation.

Among the advantages brought by analog calculation in comparison with digital are:

the absence of analog-digital (A/D) interfaces in input and digital-analog (D/A) interfaces at the output of the fuzzy processor, the computation takes place in a fully asynchronous manner, i.e., in the absence of a clock signal, and memorization of rules and membership functions takes place by means of analog levels and not through bit words to be written in appropriate memories, as takes place in digital processors.

The use of analog processors with simplified architecture in comparison with digital is made possible by the use of sophisticated emulators supplying the processor with the programming parameters starting from the definition by the user of an "objective function", i.e., an input-output law which the fuzzy processor must synthesize.

As an alternative or in synergy with the objective function, the user can also write the fuzzy inference rules and introduce another degree of freedom of the system which is to be managed by the emulator as shown in FIG. 5.

The tradition of analog structures for fuzzy logic has a first historical reference in Yamakawa's machine.

Therein the inferential operators receive a number of analog levels which is a function of the resolution, i.e., of the number of intervals in which is divided the universe of discourse U (as shown e.g., in FIG. 2), as well as the complexity of the inference rule.

In practice the number of levels to be memorized is calculated on the basis of the resolution of the universe of discourse U and on the basis of the number of input variables and the number of fuzzy sets for each variable.

It is therefore clear that complexities and dimensions of such a machine become enormous with the increase in these parameters. This technique was therefore abandoned in favor of techniques of generation of the membership functions of the fuzzy sets with circuits based on an input/output constructive law reproducing a triangular or trapezoidal form.

Introduction of this limitation in the form of the membership functions, limitation which does not prevent good operation of the fuzzy inference logic in the greater part of real applications, has allowed obtaining circuits termed "second generation" which are realizable in CMOS technology.

Among these, the most widely used is Sasaki's circuit since it appears to be the most expedient as regards simplicity and chip area occupation.

This is a structure provided in CMOS technology and having a first input under voltage for computation, a second and third inputs again under voltage for control of the position and form of the membership function, and an output under current containing the information on the degree of truth $\alpha$ of the individual membership function complemented to 1, known as $\alpha'$ or $\overline{\alpha}$.

FIG. 3a shows schematically Sasaki's membership function generator 1' receiving as input the computation voltage Vin and supplying as output the complemented value $\alpha'$ of the degree of truth a corresponding to said input. Operation of the Sasaki generator 1' is regulated by two control voltages Vr and Vf which establish the position and form of the membership function FA' generated as shown in the graphs of FIGS. 3B and 3C.

The hardware embodiment of the Sasaki generator is shown in FIG. 4 and comprises a pair of squaring circuits each comprising a pair of MOS transistors arranged so as to have as output the superposition of their partial characteristics.

Each squaring circuit is supplied by a generator of current of Imax value equal to the highest degree of activation. The Sasaki membership function generation 1' is hence an example of structure based on an input/output law of the current/voltage type.

A limitation of this circuit is the impossibility of controlling the slope of the falling and rising sections of the complementary membership function FA' generated.

A third known circuit is based on an input/output law of the current/current type and was developed by Huertas. This is a structure permitting control also of the slopes of the ascending and descending sections of the complementary membership function FA' generated at the expense however of a structural complication of the circuit.

All known circuits face the problem of insertion of analog blocks specifically assigned to calculation of the maximum (operator OR) and/or of the minimum (operator AND) of the degrees of truth $\alpha$.

These analog blocks have serious limitations in terms of area occupied and circuit response quickness.

To overcome said limitations, Landolt introduced a new method for calculation of the AND operators as described in the article "Efficient analog CMOS implementation of fuzzy rules by direct synthesis of multidimensional fuzzy subspace".

FIG. 6 shows an analog processor 2' of antecedent parts of fuzzy logic inference rules comprising a plurality of analog generators 3' of membership functions FA each having an output 4' in current.

In particular, as analog processor 2' it is possible to use the Sasaki generator already described with reference to FIG. 3A.

Every analog generator 3' supplies at the output 4' a value $\alpha'$ equal to the value complemented to one of the degree of truth a of the membership function FA generated therein opposite a given input value I.

The outputs 4' of the analog generators 3' are connected at input to a computational structure 5' which has an output 6' for producing a value $\Omega$ corresponding to the overall degree of truth of the antecedent part of the fuzzy logic rule processed by the analog processor 2'.

The computational structure 5' uses Landolt's AND operator definition and is described here in the framework of the processing of fuzzy inference rules by way of non-limiting example.

Specifically for said $\alpha_i$ and $\alpha'_i$, the degrees of truth of the assignments ($A_i$ is $A'_i$) contained in the antecedent part of the fuzzy rule to be processed and the associated complements to one respectively, the operator AND gives back the values:

1-$\Sigma\alpha'_i$ if $\Sigma\alpha'_i \leq 1$ 0 if $\Sigma\alpha'_i > 1$

The operation of the structure of FIG. 6 is as follows. The analog generators 3' linking up with said rule are connected to a common node 7' on which is input a current Imax equal to the highest degree of activation, i.e., the highest value which the overall degree of truth $\Omega$ can assume.

Application of Kirkoff's law to said node 7' shows how there flows to output 6' a current corresponding to the overall degree of truth $\Omega$ of the antecedent part of the rule to be processed in accordance with the definition of AND given above.

A one-way element and in particular a diode 8' is inserted between the node 7' and the output 6' to make the current path one-way.

Even though it fulfills the purpose this solution is not free of shortcomings either.

Thus, it is desirable to provide an analog device for computation of the antecedent part of fuzzy logic inference rules and having structural and functional characteristics such as to overcome the shortcomings which still limit the devices provided in accordance with the known art.

SUMMARY OF THE INVENTION

The principle of the present invention is to use the meaning given by Landolt to the AND operator in such a manner as to simplify the structure of a device for computation of the antecedent part of fuzzy logic inference rules and using membership functions defined analogically with AND logic operators to achieve simultaneously high performance in terms of operating interval and performance speed. Based on this principle, an analog processor of antecedent parts of a fuzzy logic rule is provided. The analog processor includes a plurality of analog generators, a current generator, a voltage control device and a one-way element. Each of the analog generators receives an input value and performs a fuzzy operation of an assignment type on the input value, and generates at the output a complemented value of an assigned value. The assigned value corresponds to a degree of truth of the assignment. The outputs of all analog generators are connected to a common node. The current generator connected to the common node generates a current that generally corresponds to a highest degree of overall truth of the antecedent parts. The voltage control device also connected to the common node controls the voltage level thereon. Finally, the one-way element also connected to the common node separates the voltage level at the common node from other circuits connected to the output of the analog processor.

The characteristics and advantages of the device in accordance with the present invention are set forth in the description of an embodiment thereof given below by way of non-limiting example with reference to the annexed drawings.

BRIEF DESCRIPTION OF THE DRAWINGS

In the drawings:

FIG. 3A shows schematically a generator of membership functions in accordance with the prior art, FIGS. 3B and 3C show complementary membership functions FA' generated by the device of FIG. 3A, FIG. 4 shows a circuitry embodiment of the device of FIG. 3A.

DETAILED DESCRIPTION OF THE DRAWINGS

Figure 1:
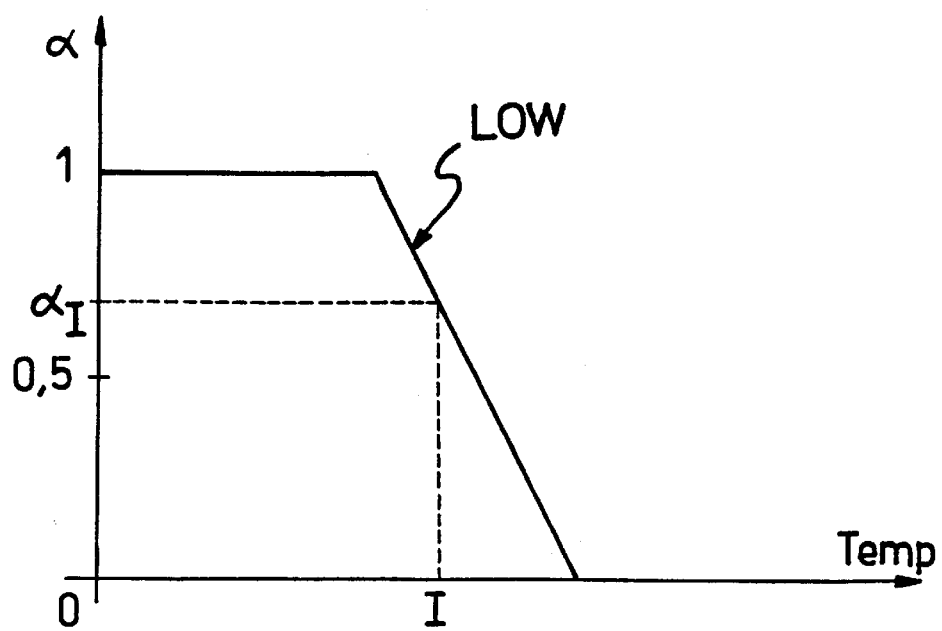
FIG. 1 shows a LOW membership function in relation to a temperature input variable.
Figure 2:
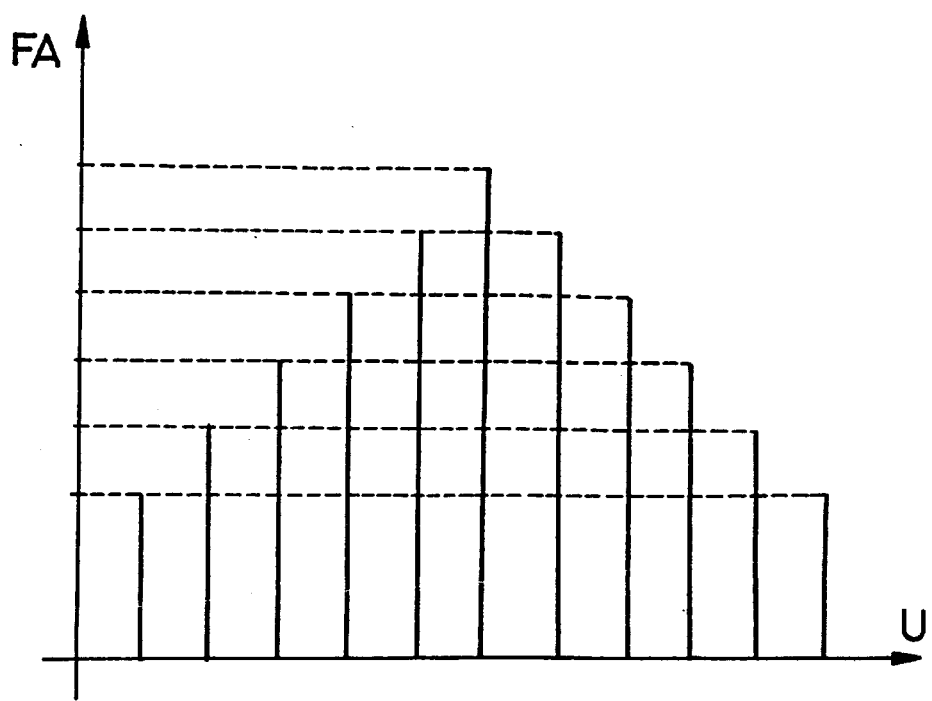
FIG. 2 shows an example of sampling of the universe of discourse U.
Figure 5:
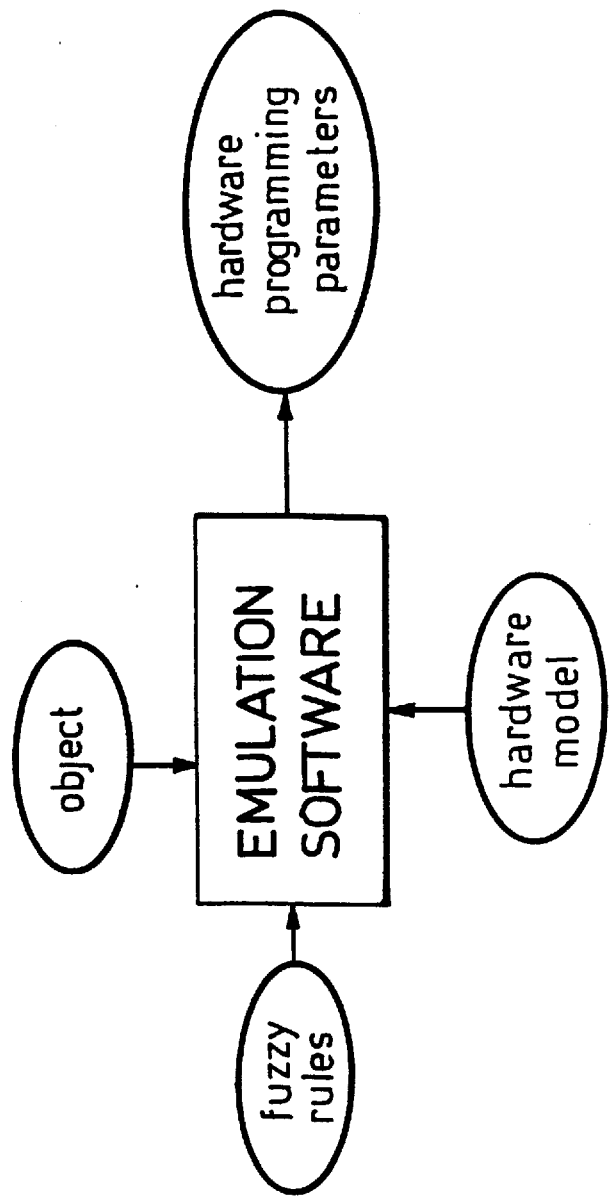
FIG. 5 shows schematically a correlation between hardware and software elements in a processor operating on fuzzy logic.
Figure 6:
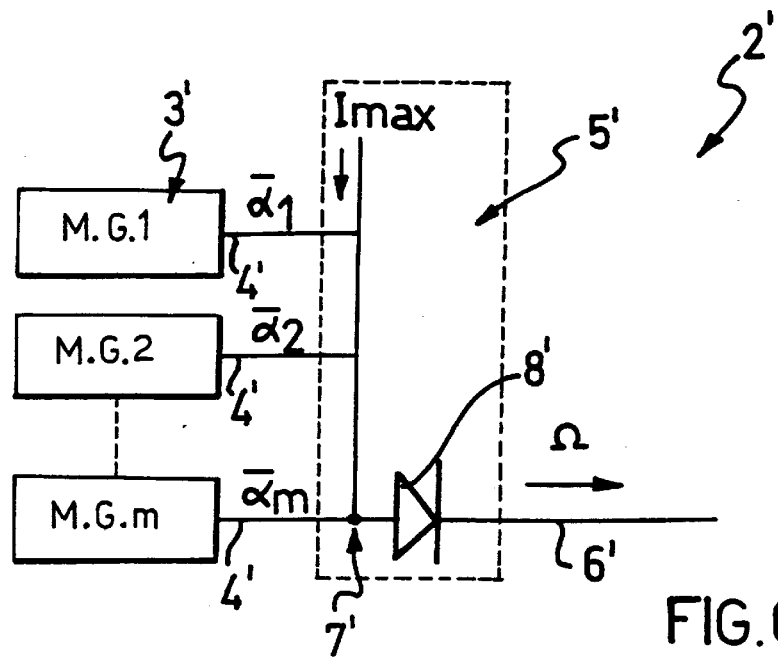
FIG. 6 shows schematically an analog processor in accordance with Landolt's definition of AND, FIG. 7 shows schematically an analog processor in accordance with the present invention.
Figure 7:
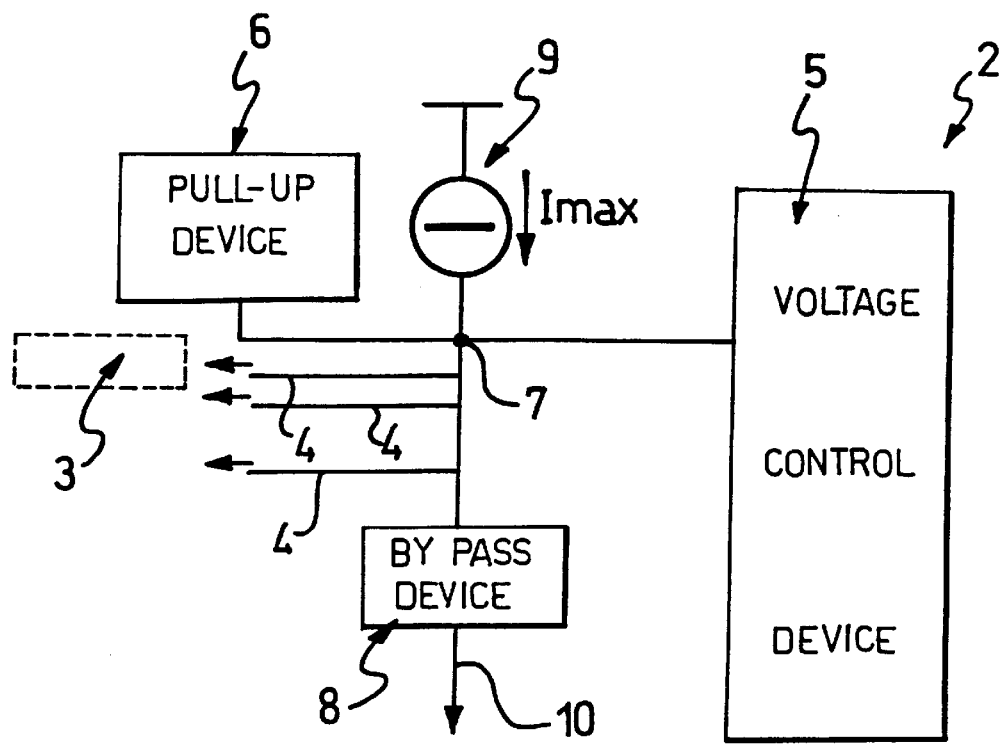

With reference to the diagram of FIG. 7 reference number 2 indicates as a whole an analog processor of antecedent parts of fuzzy inference rules using Landolt's definition of the AND operator.

The processor 2 comprises a plurality of analog generators 3 of membership functions FA. In particular said analog generators 3 can be provided by means of Sasaki generators as described in the known art.

Every analog generator 3 exhibits an output terminal 4 connected to a common circuit node 7.

The common circuit node 7 is in turn connected to a current generator 9 delivering a current Imax, to a voltage control device 5, to a voltage pull-up device 6 and to a one-way element 8.

The output of said one-way element 8 constitutes the output 10 of the processor 2 in accordance with the present invention.

Figure 8:
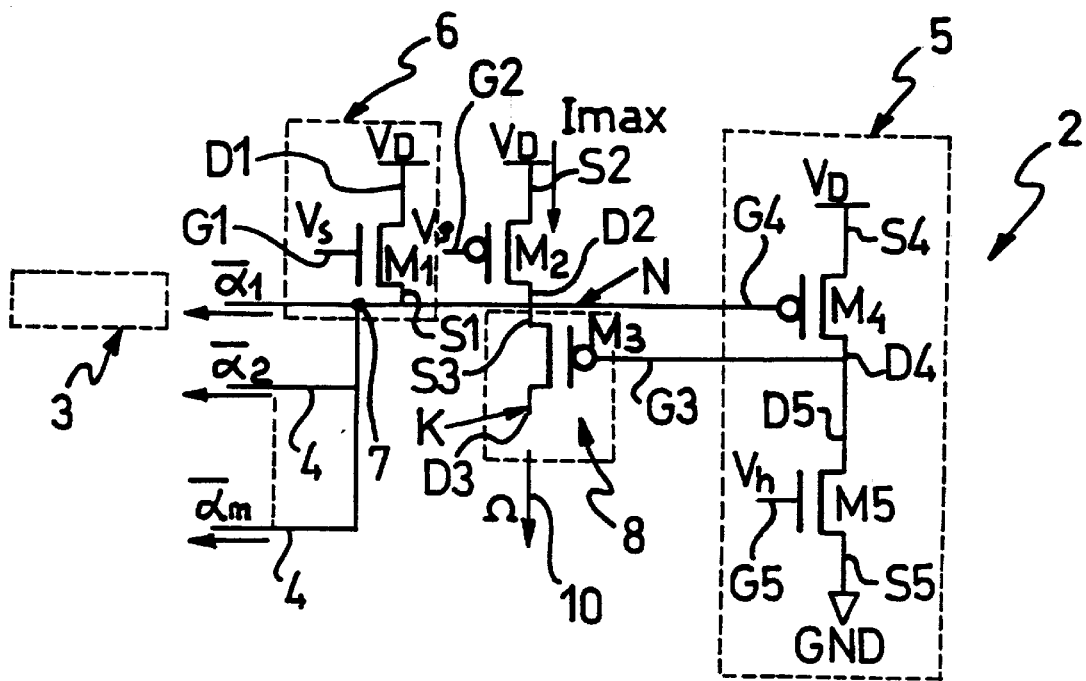
FIG. 8 shows an embodiment in CMOS technology of the diagram of FIG. 7.

FIG. 8 shows an embodiment in CMOS technology of the processor 2.

The common circuit node 7 is connected to the drain terminal D2 of a first p-channel MOS transistor M2 having its source terminal S2 connected to a supply voltage pole $V_D$.
The gate terminal G2 of the first transistor M2 receives a first polarization voltage Vg.

The common circuit node 7 is also connected to the source terminal S3 of a second p-channel MOS transistor M3 whose drain terminal D3 constitutes the output 10 of the processor 2 in accordance with the present invention.

The transistor M3 constitutes the one-way element 8 of the diagram of FIG. 7.

The common circuit node 7 is connected then to the voltage control device 5 comprising a third p-channel MOS transistor M4 and a fourth n-channel MOS transistor M5 and a second polarization voltage Vb.

In particular the common circuit node 7 is connected to the gate terminal G4 of the third transistor M4 whose source terminal S4 is connected to the pole of the supply voltage VD while the drain terminal D4 is connected to the drain terminal D5 of the fourth transistor M5.

The source terminal S5 of the fourth transistor M5 is connected to a ground reference GND while the gate terminal G5 receives the second polarization voltage Vb.

The transistors M4 and M5 form a complementary pair inserted between the power supply and ground GND. Their drain terminals D4 and D5 are connected to the gate terminal G3 of the second transistor M3.

Advantageously the common circuit node 7 is connected also to the voltage pull-up device 6 comprising a fifth n-channel MOS transistor M1.

The common circuit node 7 is indeed connected to the source terminal S1 of the fifth transistor M1 which has its drain terminal D1 connected to the pole of the supply voltage $V_D$.

The gate terminal G1 of the fifth transistor M1 receives a third polarization voltage Vs.

We shall now discuss operation of said analog processor 2.

The first transistor M2 is biased through the first polarization voltage Vg in such a way as to generate a current Imax corresponding to the highest degree of truth of the membership functions of the fuzzy rule to be processed.

The transistors M4 and M5 hold the common circuit node 7 at a very steady fixed potential and annulling the modulation effects of the current Imax generated by the first transistor M2 with the change in the drain-source voltage of the transistor M2. They also constitute null current absorption paths.

The second biasing voltage Vb allows control of the voltage at the common circuit node 7.

The second transistor M3 separates in voltage the common circuit node 7 held at a steady value in voltage from the output 10 so that any circuits connected downstream of the processor 2 will not affect its regular operation.

To do this, the transistor M3 is biased through the drain voltage of the transistors M4 and M5 which varies with variation in the operating conditions of the processor 2.

Advantageously the fifth transistor M1 is biased through the third polarization voltage Vs at the boundary of the interdiction zone. In this manner delivery of a current sufficient to maintain in saturation the n-channel MOS transistors present at the output of the analog generators 3 as provided by Sasaki is ensured if the following conditions occur:

$$\Sigma \alpha'_i > 1.$$

This holds a voltage level at the common circuit node 7 capable of ensuring high response speed of the circuit in accordance with the present invention.

The use of an analog processor in accordance with the present invention brings two main advantages:

it raises the voltage of the common circuit node 7 and thus widens the interval of operation for the analog generators 3 due to the presence of the voltage control device 5, and it quickens the processor 2 in the passage from the operating condition where:

$$\Sigma \alpha'_i > 1.$$

to that where:

$$\Sigma \alpha'_i \leq 1.$$

due to the presence of the voltage pull-up device 6.

Figure 9:
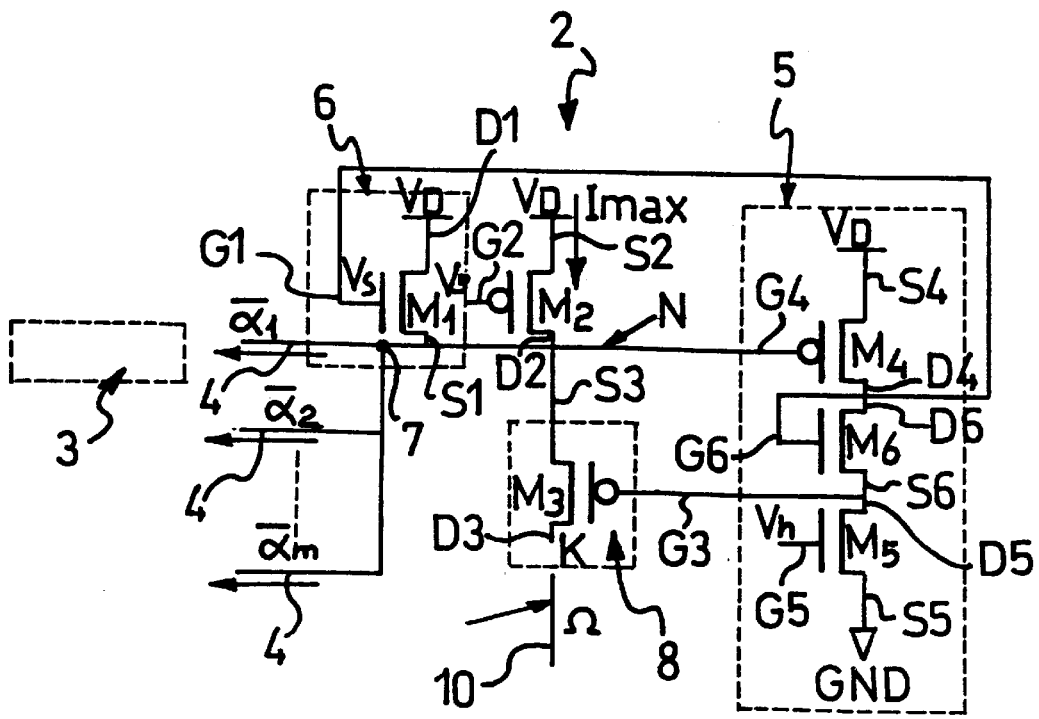
FIG. 9 shows another embodiment in CMOS technology of the diagram of FIG. 7.

FIG. 9 shows an alternative embodiment with CMOS technology for the processor 2 in accordance with the present invention.

In this FIG. 9 is seen how the voltage control device 5 comprises a sixth n-channel MOS transistor M6 inserted between the third transistor M4 and the fourth transistor M5.

In particular the drain terminal D6 and gate terminal G6 of the sixth transistor M6 are connected to the drain terminal of the third transistor M4 while the source terminal S6 of the sixth transistor M6 is connected to the drain terminal D5 of the fourth transistor M5.

In addition, the gate terminal G6 of the sixth transistor M6 is advantageously connected to the gate terminal G1 of the fifth transistor M1.

The embodiment of FIG. 9 brings two further advantages in relation to that of FIG. 8:

The presence of an external supply voltage Vs is no longer necessary since the sixth transistor M6 connected as a diode supplies to the fifth transistor M1 a voltage sufficient to interdict said transistor M1 when the output 10 exhibits a value $\Omega > 0$. In addition, the voltage variations of the gate terminal G6 of the sixth transistor M6 which is connected to the gate terminal G1 of the fifth transistor M1 satisfy the current requirement of the analog generators 3 connected to the common circuit node 7 even when the output value $\Omega$ is zero.

The voltage decrease at nodes N and G3 of FIG. 9, in the case of $\Omega = 0$, is less than that of the respective nodes in the circuit of FIG. 8. Thus, when the output 10 changes from $\Omega = 0$ to $\Omega > 0$, the processor 2 adjusts to the new working condition in less time.

We claim:

1. An analog processor of antecedent parts of a fuzzy logic rule, comprising:

a plurality of analog generators of membership functions with each analog generator having an input for receiving an input value, each performing a fuzzy operation of an assignment type on the input variable and generating at the output a complemented value of an assigned value corresponding to a degree of truth of the assignment, the outputs of the plurality of analog generators being connected together to form a common node;

a current generator connect to the common node;

a voltage control device directly connected to the common node; and a one-way element connected to the common node and generating at its output a degree of overall truth of the antecedent parts of the fuzzy logic rule.

2. The analog processor according to claim 1 wherein the voltage control device includes:

a first transistor having a control terminal connected to the common node; and a second transistor connected in series with the first transistor and defining a second common node therebetween, the second transistor having a control terminal for receiving a bias voltage to control the voltage level at the common node.

3. The analog processor according to claim 2 wherein the one-way element includes a transistor having a control terminal connected to the second common node.

4. The analog processor according to claim 3, further comprising a pull-up circuit separate from the plurality of analog generators and from the voltage control device, the pull-up circuit having an output connected to the common node for pulling up the voltage level thereon.

5. The analog processor according to claim 4 wherein the pull-up circuit includes a transistor having an output connected to the common node.

6. The analog processor according to claim 5 wherein each of the plurality of analog generators includes at least one transistor connected to the output of the respective analog generator, and the transistor of the pull-up circuit is biased at the boundary of an interdiction zone so as to ensure sufficient current to hold the transistors of the plurality of analog generators in saturation if a condition $\Sigma$ (complemented value of assigned value)$_i > 1$ occurs.

7. The analog processor according to claim 2 wherein the voltage control device further includes a third transistor connected between and in series with the first and second transistors.

8. The analog processor according to claim 7, further comprising a pull-up circuit having an output connected to the common node for pulling up the voltage level thereat.

9. The analog processor according to claim 8 wherein the pull-up circuit includes a transistor having an output connected to the common node.

10. The analog processor according to claim 1 wherein the current generator produces a current corresponding to the highest degree of truth of the membership fuctions of the fuzzy logic rule.

11. The analog processor according to claim 10 wherein the current generator includes a transistor connected to the common node.

12. The analog processor according to claim 11 wherein the voltage control device maintains a steady voltage at the common node and neutralizes the modulation effects of the current generated by the current generator.

13. The analog processor according to claim 2 wherein the first and second transistors of the voltage control device constitute null current absorption paths.

14. An analog processor of antecedent parts of a fuzzy logic rule, comprising:

a plurality of analog generators with each analog generator having an input for receiving an input value, each performing a fuzzy operation of an assignment type on the input value and generating at the output a complemented value of an assigned value corresponding to a degree of truth of the assignment, the outputs of the plurality of analog generators being connected together and defining a common node;

a current generator connected to the common node, the current generator producing at the common node a current corresponding to the highest degree of overall truth of the antecedent parts of the fuzzy logic rule;

a voltage control device connected to the common node for controlling the voltage level thereon; and a one-way element connected to the common node and generating at its output a degree of overall truth of the antecedent parts processed by the plurality of analog generators.

15. An analog processor of antecedent parts of fuzzy logic inference rules comprising:

a plurality of analog generators of membership functions each having an output supplying a value corresponding to a degree of truth complemented to one of logical assignments and said outputs are connected together to form a common circuit node, said node being connected also to a current generator;

a supply voltage and a ground voltage reference;

a voltage control device positioned between the supply voltage and the ground voltage reference; and a one-way element connected to the common circuit node and said one-way element having an output producing a degree of overall truth related to the antecedent part of the fuzzy rule to be processed.

16. Analog processor in accordance with claim 15, characterized in that said voltage control device comprises a first and second transistors inserted in mutual series between said pole of the supply voltage and the second ground voltage reference and the command terminal of the first transistor being connected to said common circuit node and the command terminal of the second transistor being connected to a first polarization voltage pole.

17. Analog processor in accordance with claim 16, characterized in that said one-way element comprises a third transistor whose control terminal is connected to the drain terminal of said first transistor and whose source terminal is connected to the common circuit node.

18. Analog processor in accordance with claim 17, characterized in that it comprises another voltage pull-up device inserted between said supply voltage reference and the common circuit node.

19. Analog processor in accordance with claim 18, characterized in that said voltage pull-up device comprises a fourth transistor whose command terminal is connected to a second polarization voltage pole and whose source terminal is connected to the common circuit node.

20. Analog processor in accordance with claim 16, characterized in that said voltage control device comprises a fifth transistor having its drain and gate terminals connected to each other, the fifth transistor being connected between the drain terminal of the first transistor and the drain terminal of the second transistor.

21. Analog processor in accordance with claim 20, characterized in that it comprises another voltage pull-up device inserted between said supply voltage reference and the common circuit node.

22. Analog processor in accordance with claim 21, characterized in that said voltage pull-up device comprises a fourth transistor whose command terminal is connected to the command terminal of the fifth transistor and whose source terminal is connected to the common circuit node.

23. Analog processor in accordance with claim 15, characterized in that said current generator delivers a current equal to the highest degree of truth of the membership functions of the fuzzy rule to be processed.

24. Analog processor in accordance with claim 23, characterized in that said current generator comprises a sixth transistor whose source terminal is connected to the supply voltage pole and whose drain terminal is connected to the common circuit node and whose command terminal receives a third polarization voltage.

25. Analog processor in accordance with claim 24, characterized in that said voltage control device holds the common circuit node at a fixed and very steady potential and annuls the modulation effects of the current delivered by the current generator with variation in the drain-source voltage of the sixth transistor.

26. Analog processor in accordance with claim 19, characterized in that said fourth transistor included in the voltage pull-up device is biased at the boundary of the interdiction zone through said second polarization voltage in such a manner as to ensure delivery of a current sufficient to hold in saturation the transistors present in the analog generators if the following condition occurs:

$$\Sigma \alpha'_i > 1.$$

27. Analog processor in accordance with claim 17, characterized in that said third transistor included in said one-way element separates in voltage the common circuit node held at a steady value in voltage from the output so that any circuits connected downstream of the processor do not affect its regular operation.

28. Analog processor in accordance with claim 16, characterized in that said first and second transistors constitute null current absorption paths.

29. The analog processor of claim 15 wherein the logical assignments are of the (A is A') type.

* * * * *